(12) United States Patent
Araki et al.

(10) Patent No.: US 12,340,953 B2
(45) Date of Patent: Jun. 24, 2025

(54) SOLID ELECTROLYTIC CAPACITOR AND METHOD FOR MANUFACTURING SOLID ELECTROLYTIC CAPACITOR WITH IMPROVED ANODE LEAD-OUT WIRE

(71) Applicant: TOKIN Corporation, Shiroishi (JP)

(72) Inventors: Kenji Araki, Sendai (JP); Akihiro Kawai, Sendai (JP)

(73) Assignee: TOKIN CORPORATION, Shiroishi (JP)

( * ) Notice: Subject to any disclaimer, the term of this patent is extended or adjusted under 35 U.S.C. 154(b) by 158 days.

(21) Appl. No.: 18/163,150

(22) Filed: Feb. 1, 2023

(65) Prior Publication Data
US 2023/0268135 A1    Aug. 24, 2023

(30) Foreign Application Priority Data
Feb. 24, 2022    (JP) ................................. 2022-026354

(51) Int. Cl.
| H01G 9/04 | (2006.01) |
| H01G 9/00 | (2006.01) |
| H01G 9/08 | (2006.01) |
| H01G 9/15 | (2006.01) |

(52) U.S. Cl.
CPC ............. *H01G 9/04* (2013.01); *H01G 9/0036* (2013.01); *H01G 9/08* (2013.01); *H01G 9/15* (2013.01)

(58) Field of Classification Search
CPC .......... H01G 9/15; H01G 9/08; H01G 9/0036; H01G 9/04
See application file for complete search history.

(56) References Cited

U.S. PATENT DOCUMENTS

| 2003/0222734 | A1  | 12/2003 | Arai et al. |            |
|--------------|-----|---------|-------------|------------|
| 2008/0094812 | A1* | 4/2008  | Kuriyama    | H01G 9/15  |
|              |     |         |             | 361/523    |
| 2008/0218944 | A1* | 9/2008  | Kuriyama    | H01G 9/052 |
|              |     |         |             | 361/523    |
| 2008/0247122 | A1* | 10/2008 | Vaisman     | H01G 9/15  |
|              |     |         |             | 29/25.03   |
| 2011/0096467 | A1* | 4/2011  | Taketani    | H01G 9/08  |
|              |     |         |             | 29/25.03   |
| 2013/0279078 | A1* | 10/2013 | Djebara     | H01G 9/15  |
|              |     |         |             | 29/25.03   |

(Continued)

FOREIGN PATENT DOCUMENTS

| JP | 2004007105 A   | 1/2004  |
|----|----------------|---------|
| JP | 2004281619 A * | 10/2004 |

(Continued)

*Primary Examiner* — David M Sinclair
(74) *Attorney, Agent, or Firm* — McCoy Russell LLP

(57) ABSTRACT

A solid electrolytic capacitor capable of improving manufacturing yield is provided. A solid electrolytic capacitor according to one aspect of the present disclosure includes an anode lead-out wire and a capacitor element in which the anode lead-out wire is embedded. The cross section of at least a part of the anode lead-out wire in a direction in which the anode lead-out wire is extended has a flat shape, and a recess provided in a central part, a first linear part that is extended outward from one side of the recess, and a second linear part that is extended outward from another side of the recess are formed in at least one of an upper surface and a lower surface of the anode lead-out wire having the flat shape.

9 Claims, 6 Drawing Sheets

COMPARATIVE EXAMPLE

PRESENT DISCLOSURE

(56) References Cited

U.S. PATENT DOCUMENTS

| | | | | |
|---|---|---|---|---|
| 2014/0254067 A1* | 9/2014 | Myung | ............... | H01G 9/012 |
| | | | | 361/525 |
| 2017/0040118 A1* | 2/2017 | Zednicek | ............... | H01G 9/15 |
| 2022/0270828 A1* | 8/2022 | Saito | ............... | H01G 9/15 |

FOREIGN PATENT DOCUMENTS

| JP | 2005294527 A | * | 10/2005 |
|---|---|---|---|
| JP | 2008159826 A | * | 7/2008 |
| JP | 2011071151 A | * | 4/2011 |

* cited by examiner

SOLID ELECTROLYTIC CAPACITOR AND METHOD FOR MANUFACTURING SOLID ELECTROLYTIC CAPACITOR WITH IMPROVED ANODE LEAD-OUT WIRE

INCORPORATION BY REFERENCE

This application is based upon and claims the benefit of priority from Japanese patent application No. 2022-26354, filed on Feb. 24, 2022, the disclosure of which is incorporated herein in its entirety by reference.

BACKGROUND

The present disclosure relates to a solid electrolytic capacitor and a method for manufacturing the solid electrolytic capacitor.

In recent years, solid electrolytic capacitors have been widely used in various fields such as the field of electronic apparatuses. Japanese Unexamined Patent Application Publication No. 2004-7105 discloses a technique regarding a noise filter including a tantalum fine wire, a capacitance forming portion provided around the tantalum fine wire, and a conductor layer provided around the capacitance forming portion.

SUMMARY

The noise filter (a solid electrolytic capacitor) disclosed in Japanese Unexamined Patent Application Publication No. 2004-7105 includes a tantalum fine wire (an anode lead-out wire) having a cylindrical structure (i.e., a circular cross-sectional shape). However, the anode lead-out wire having a cylindrical structure may cause a welding failure to occur when the anode lead-out wire and a lead frame are welded together. Further, when the anode lead-out wire is thinned while its cylindrical structure is maintained or flattened in such a way that the anode lead-out wire has a flat cross section in order to reduce the thickness of the solid electrolytic capacitor, the anode lead-out wire may be bent when the anode lead-out wire is inserted into anode body powder, which causes a problem that manufacturing yield is degraded.

In view of the aforementioned problem, an object of the present disclosure is to provide a solid electrolytic capacitor capable of improving manufacturing yield and a method for manufacturing the solid electrolytic capacitor.

A solid electrolytic capacitor according to one aspect of the present disclosure includes: an anode lead-out wire; and a capacitor element in which the anode lead-out wire is embedded, in which a cross section of at least a part of the anode lead-out wire in a direction in which the anode lead-out wire is extended has a flat shape, and a recess provided in a central part, a first linear part that is extended outward from one side of the recess, and a second linear part that is extended outward from another side of the recess are formed in at least one of an upper surface and a lower surface of the anode lead-out wire having the flat shape.

A method for manufacturing a solid electrolytic capacitor according to one aspect of the present disclosure includes: a first process of forming a wire having a substantially circular cross section by holding the wire by first and second rollers that are disposed so as to be opposed to each other, thereby forming an anode lead-out wire having a flat cross section; and a second process of forming a capacitor element in which the anode lead-out wire is embedded. A protrusion provided in a central part, a third linear part that is extended outward from one side of the protrusion, and a fourth linear part that is extended outward from another side of the protrusion are provided in at least one of the first and second rollers. In at least one of an upper surface and a lower surface of the anode lead-out wire formed in the first process, a recess is formed in a central part, and a first linear part that is extended outward from one side of the recess is formed in one side of the recess and a second linear part that is extended outward from another side of the recess is formed in another side of the recess.

According to the present disclosure, it is possible to provide a solid electrolytic capacitor capable of improving manufacturing yield, and a method for manufacturing the solid electrolytic capacitor.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure will be described hereinafter with reference to the drawings.

Figure 1:
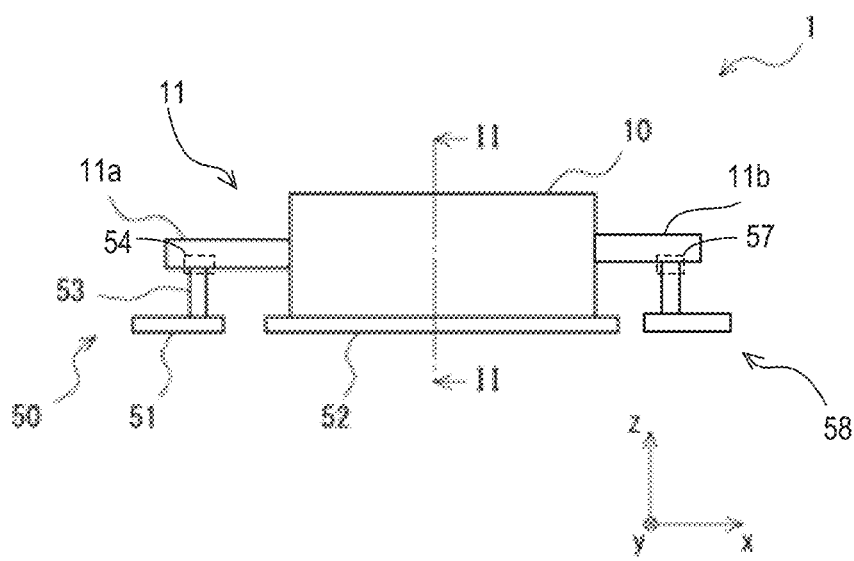
FIG. 1 is a side view showing one example of a solid electrolytic capacitor according to an embodiment.

FIG. 1 is a side view showing one example of a solid electrolytic capacitor according to this embodiment. As shown in FIG. 1, a solid electrolytic capacitor 1 according to this embodiment includes a capacitor element 10 and an anode lead-out wire 11.

A part of the anode lead-out wire 11 is embedded in the capacitor element 10 and a part of the anode lead-out wire 11 that is exposed from the capacitor element 10 is connected to an anode lead frame 50. Specifically, the anode lead frame 50 includes a pedestal part 51 that is extended in a horizontal direction (an x-axis direction) and an erected part 53 that is erected in a vertical direction (a z-axis direction) from the pedestal part 51. Then, the anode lead-out wire 11 is connected to the top surface of the erected part 53, whereby the anode lead-out wire 11 and the anode lead frame 50 are electrically connected to each other. For example, the anode lead-out wire 11 is connected to the erected part 53 by welding 54. The pedestal part 51 is connected to a substrate (not shown). In some examples, the anode lead-out wire 11 penetrates the capacitor element 10, and the anode lead-out wire forms a first anode lead-out wire 11a in one side of the anode lead-out wire exposed from the capacitor element 10 and forms a second anode lead-out wire 11b in another side thereof. Further, the first anode lead-out wire 11a may be welded to a first anode lead frame 50 erected from a substrate, and the second anode lead-out wire 11b may be welded 57 to a second anode lead frame 58 erected from the substrate.

A cathode body 15 (see FIG. 2) of the capacitor element 10 is electrically connected to a cathode terminal 52 on a lower surface side (a negative side in the z-axis direction) of the capacitor element 10. For example, the cathode body 15 is connected to the cathode terminal 52 using a conductive adhesive. The cathode terminal 52 is connected to a substrate (not shown).

The configuration example in FIG. 1 shows a configuration in which the anode lead-out wire 11 is embedded in the capacitor element 10 and the anode lead-out wire 11 is exposed from one side of the capacitor element 10 (two-terminal structure). However, in this embodiment, a configuration in which the anode lead-out wire 11 penetrates the capacitor element 10 and the anode lead-out wire 11 is exposed from both sides of the capacitor element 10 (three-terminal structure) may instead be employed.

Figure 2:
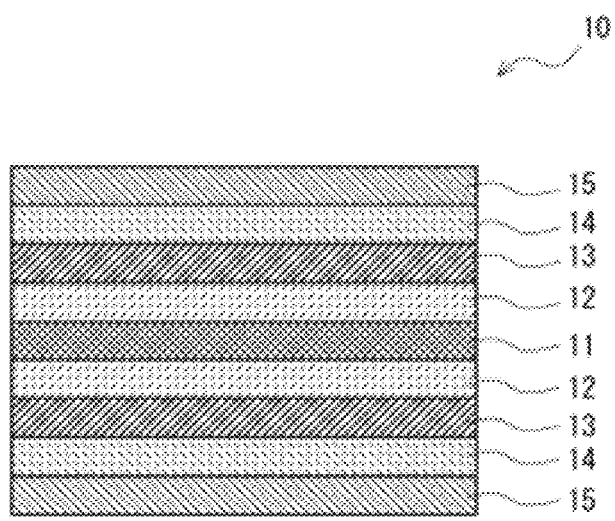
FIG. 2 is a partial cross-sectional view of a central part taken along the cutting line II-II of FIG. 1.

FIG. 2 is a cross-sectional view for describing an internal structure of the capacitor element 10 and is a partial cross-sectional view of the central part taken along the cutting line II-II of FIG. 1. As shown in FIG. 2, the capacitor element 10 includes an anode body 12, a dielectric layer 13, a solid electrolyte layer 14, and a cathode body 15. The capacitor element 10 has a central part where the anode lead-out wire 11 is disposed.

The anode lead-out wire 11 is formed of, for example, metallic tantalum (Ta). The details of the anode lead-out wire 11 will be described later.

The anode body 12 covers the periphery of the anode lead-out wire 11 (covers a part of the anode lead-out wire 11 other than the part of the anode lead-out wire 11 exposed from the capacitor element 10). The anode body 12 may be formed using metallic tantalum (Ta), which is a valve metal. The anode body 12 may be formed, for example, by inserting the anode lead-out wire 11 into a metallic tantalum powder (the anode body 12) and then sintering it.

The dielectric layer 13 is formed on a surface of the anode body 12. For example, the dielectric layer 13 can be formed by anodizing the surface of the anode body 12. For example, when tantalum is used for the anode body 12, a tantalum oxide film (the dielectric layer 13) can be formed on the surface of the anode body 12 by anodizing the anode body 12. For example, the thickness of the dielectric layer 13 can be appropriately adjusted by a voltage of the anodization.

The solid electrolyte layer 14 is formed on a surface of the dielectric layer 13. For example, the solid electrolyte layer 14 can be formed using a conductive polymer. In order to form the solid electrolyte layer 14, for example, chemical oxidation polymerization or electrolytic polymerization may be used. Alternatively, the solid electrolyte layer 14 may be formed by coating or impregnating a workpiece with a conductive polymer solution and drying it.

The solid electrolyte layer 14 may include, for example, a polymer composed of a monomer including at least one kind of pyrrole, thiophene, aniline, and derivative thereof. In addition, a sulfonic acid-based compound may be included as a dopant. In addition to the above conductive polymer, the solid electrolyte layer 14 may include an oxide material such as manganese dioxide and ruthenium oxide, and an organic semiconductor such as TCNQ (7,7,8,8-tetracyanoquinodimethane complex salt).

The cathode body 15 is formed on a surface of the solid electrolyte layer 14. For example, the cathode body 15 may be formed of a graphite layer formed on the surface of the solid electrolyte layer 14 and a silver paste layer formed on the surface of the graphite layer. The cathode body 15 is connected to the cathode terminal 52 using a conductive adhesive on the lower surface side of the capacitor element 10 (the negative side in the z-axis direction).

Figure 3:
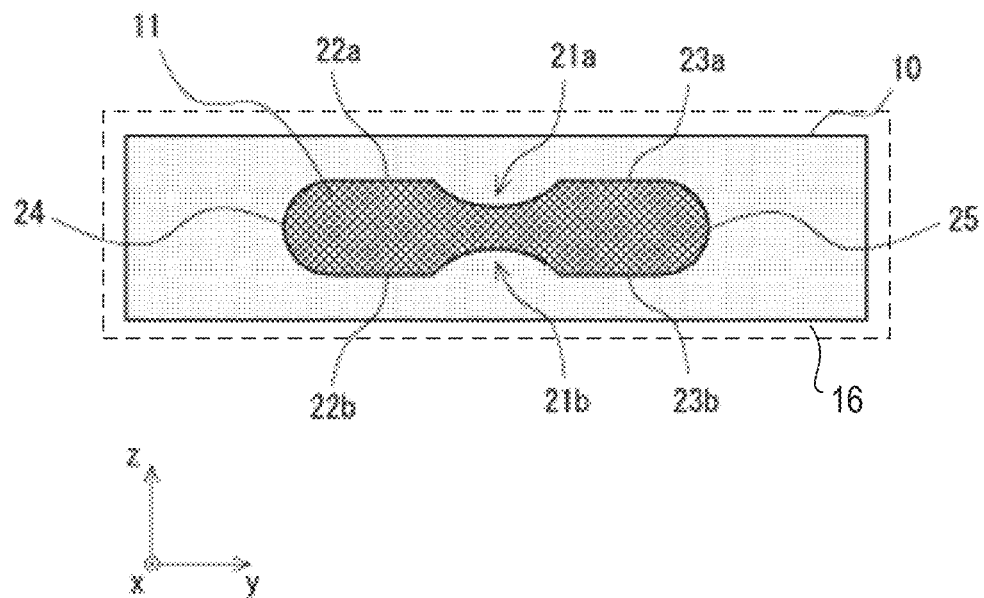
FIG. 3 is a cross-sectional view of a capacitor element part of the solid electrolytic capacitor according to the embodiment.

FIG. 3 is a cross-sectional view of the capacitor element part of the solid electrolytic capacitor according to this embodiment, and is a cross-sectional view for describing the cross-sectional shape of the capacitor element 10 and the anode lead-out wire 11. In FIG. 3, the cathode terminal 52 is not shown.

As shown in FIG. 3, the anode lead-out wire 11 is embedded in the capacitor element 10. In this embodiment, the shape of the cross section of the capacitor element 10 (the cross section of the capacitor element 10 taken along the yz-plane) is a rectangular shape in which the longitudinal direction is extended in the horizontal direction (a y-axis direction). For example, the height of the capacitor element 10 (the length thereof in the z-axis direction) is preferably 2.0 mm or smaller. Further, in the solid electrolytic capacitor according to this embodiment, the capacitor element 10 may be encased in an exterior resin 16. In this case, the height of the solid electrolytic capacitor including the exterior resin 16 is preferably 3.0 mm or smaller.

The shape of the cross section of the anode lead-out wire 11 that is vertical to the direction in which the anode lead-out wire 11 is extended (the x-axis direction) is flat. Further, a recess 21a provided in the central part, a first linear part 22a that is extended outward (a negative side in the y-axis direction) from one side of the recess 21a, and a second linear part 23a that is extended outward (a positive side in the y-axis direction) from the other side of the recess 21a are formed on the upper surface of the anode lead-out wire 11. Likewise, a recess 21b provided in the central part, a first linear part 22b that is extended outward (the negative side in the y-axis direction) from one side of the recess 21b, and a second linear part 23b that is extended outward (the positive side in the y-axis direction) from the other side of the recess 21b are formed on the lower surface of the anode lead-out wire 11. Further, both side parts of the anode lead-out wire 11 (both end parts in the y-axis direction) held between the upper surface and the lower surface of the anode lead-out wire 11 respectively include curved shapes 24 and 25 that bulge outward. In the following description, the recesses 21a and 21b may be collectively referred to as a recess 21. The same holds true for the other components.

In the configuration example shown in FIG. 3, a configuration in which the cross-sectional shape of the recesses 21a and 21b is a curved shape is shown. Alternatively, in this embodiment, the cross-sectional shape of the recesses 21a and 21b may be a shape other than the curved shape and is not particularly limited as long as it has a shape that is gradually deepened toward the central part of the recesses 21a and 21b. The cross-sectional shape of the recesses 21a and 21b may be a trapezoidal shape or a V shape. By making the cross-sectional shape of the recesses 21a and 21b have the shape of this kind, flowability of the anode body powder on the surface of the recesses 21a and 21b can be improved when the anode lead-out wire 11 is inserted into the anode body powder.

Figure 4:
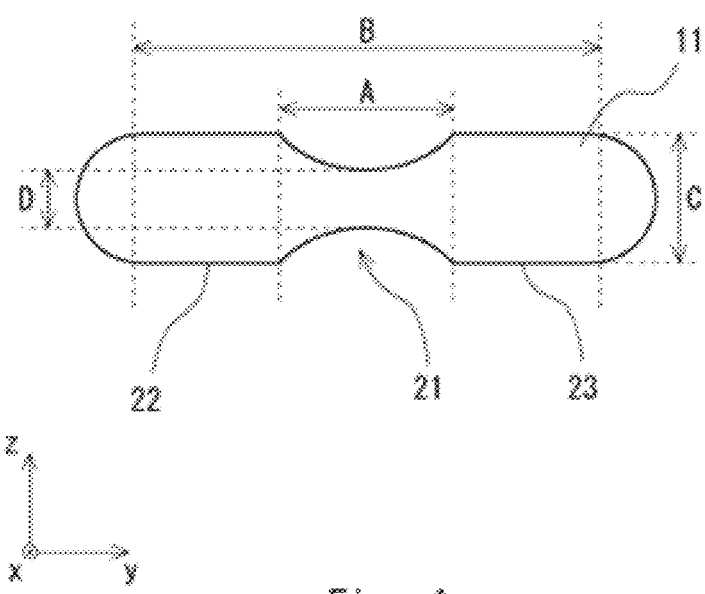
FIG. 4 is a cross-sectional view showing a configuration example of an anode lead-out wire included in the solid electrolytic capacitor according to the embodiment.

As shown in FIG. 4, in this embodiment, when the distance between one side of the recess 21 of the anode lead-out wire 11 and the other side of the recess 21 thereof is denoted by A and the distance between the outer edge part of the first linear part 22 and the outer edge part of the second linear part 23 is denoted by B, the value of A/B may be 0.05 or larger and 0.95 or smaller, and preferably 0.1 or larger and 0.9 or smaller. More preferably, when the strength of the anode lead-out wire 11 itself is taken into account, in particular, the value of A/B is 0.2 or larger and 0.5 or smaller.

Further, in this embodiment, when the thickness of the anode lead-out wire 11 is denoted by C and the distance between the bottom of the recess 21a on the upper surface and the bottom of the recess 21b on the lower surface is denoted by D, the value of D/C may be 0.05 or larger and 0.95 or smaller, preferably 0.1 or larger and 0.9 or smaller. More preferably, when the strength of the anode lead-out wire 11 itself is taken into account, in particular, the value of D/C is 0.5 or larger and 0.8 or smaller.

In this embodiment, in both of the part of the anode lead-out wire 11 embedded in the capacitor element 10 and the part of the anode lead-out wire 11 that is exposed from the capacitor element 10, the cross-sectional shape of the anode lead-out wire 11 may be the shape as shown in FIG. 4 (a shape including the recess 21, the first linear part 22, and the second linear part 23).

Further, in this embodiment, in at least a part of the direction in which the anode lead-out wire 11 is extended (the x-axis direction), the cross-sectional shape of the anode lead-out wire 11 may be a shape as shown in FIG. 4 (a shape including the recess 21, the first linear part 22, and the second linear part 23). Specifically, in a part of the anode lead-out wire 11 embedded in the capacitor element 10, the cross-sectional shape of the anode lead-out wire 11 may be a shape as shown in FIG. 4. In the other part of the anode lead-out wire 11, the cross-sectional shape of the anode lead-out wire 11 may be another shape. Further, in a part of the anode lead-out wire 11 that is exposed from the capacitor element 10, the cross-sectional shape of the anode lead-out wire 11 may be a shape as shown in FIG. 4. In the other part of the anode lead-out wire 11, the cross-sectional shape of the anode lead-out wire 11 may be another shape.

In the configuration example shown in FIGS. 3 and 4, a configuration in which the recesses 21a and 21b, the first linear parts 22a and 22b, and the second linear parts 23a and 23b are provided in both the upper surface and the lower surface of the anode lead-out wire 11 is shown. Alternatively, in this embodiment, the recess 21, the first linear part 22, and the second linear part 23 may be provided in only one of the upper surface and the lower surface of the anode lead-out wire 11. In this case, the recess 21, the first linear part 22, and the second linear part 23 are preferably provided on a surface of the anode lead-out wire 11 where the anode lead-out wire 11 contacts the anode lead frame 50 (the erected part 53).

As described above, in this embodiment, the cross-sectional shape of the anode lead-out wire 11 of the solid electrolytic capacitor is a flat shape. Then the recess 21, the first linear part 22 that is extended outward from one side of the recess 21, and the second linear part 23 that is extended outward from the other side of the recess 21 are formed in at least one of the upper surface and the lower surface of the anode lead-out wire 11.

In this embodiment, the shape of the anode lead-out wire 11 is the one described above, whereby it is possible to prevent a welding failure from occurring when the anode lead-out wire is welded to the lead frame. It is also possible to prevent the anode lead-out wire from being bent when the anode lead-out wire is inserted into the anode body powder. Therefore, with the invention according to this embodiment, it is possible to provide a solid electrolytic capacitor capable of improving manufacturing yield, and a method for manufacturing the solid electrolytic capacitor.

Figure 5:
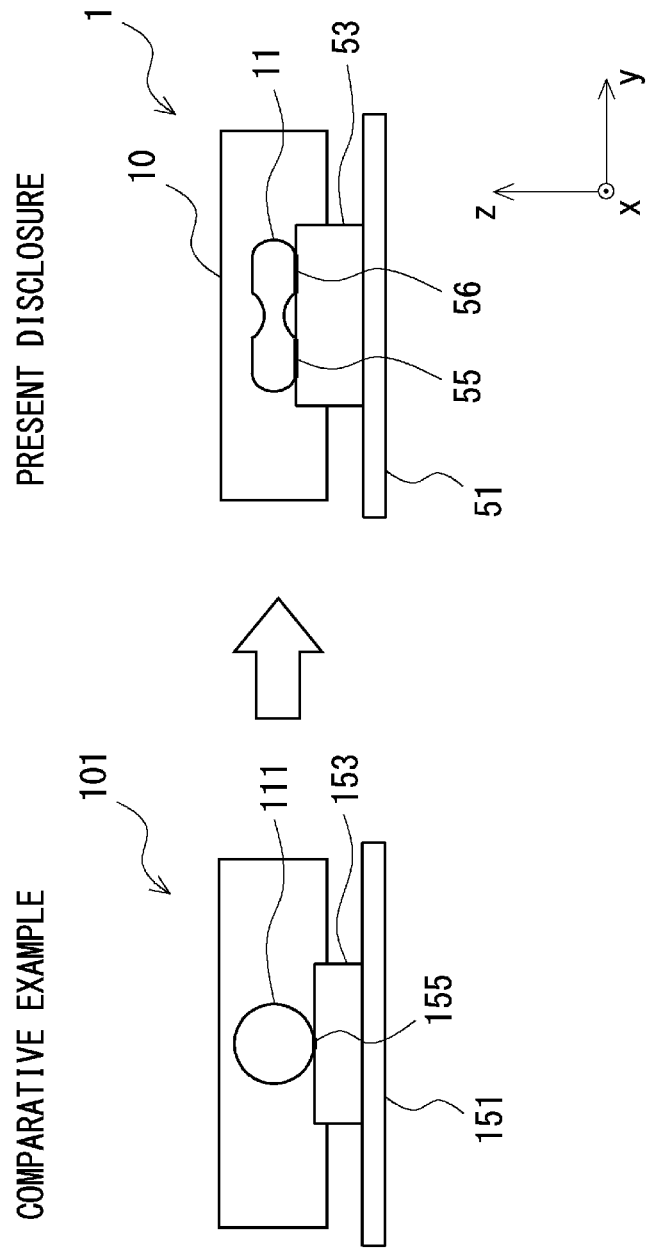
FIG. 5 is a cross-sectional view for describing an effect of the present disclosure.
Figure 6:
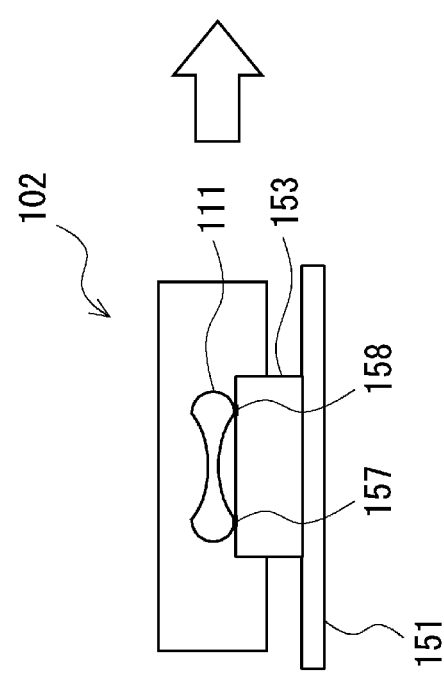
FIG. 6 is a cross-sectional view for describing an effect of the present disclosure.

FIGS. 5 and 6 are cross-sectional views for explaining effects of the present disclosure. As shown in the left view of FIG. 5, in a solid electrolytic capacitor 101 according to a comparative example, an anode lead-out wire 111 has a cylindrical structure, that is, a cross-sectional shape of the anode lead-out wire 111 is circular. Thus, a contact part 155 where an erected part 153 erected from a pedestal part 151 (anode lead frame) contacts the anode lead-out wire 111 is a point, and thus the solid electrolytic capacitor 101 becomes unstable. Therefore, when a cathode body is adhered to a cathode terminal using a conductive adhesive, there is a case where the solid electrolytic capacitor 101 is inclined, which causes an adhesion failure, or a case in which a capacitor element is exposed from an exterior resin, which causes an exposure failure.

On the other hand, in the solid electrolytic capacitor 1 according to this embodiment, as shown in the right view of FIG. 5, the anode lead-out wire 11 includes the first linear part 22 and the second linear part 23. Thus, contact parts 55 and 56 where the erected part 53 contacts the anode lead-out wire 11 are linear, and thus the solid electrolytic capacitor 1 is stable. It is therefore possible to reduce occurrence of an adhesion failure or an exposure failure.

Further, as shown in the left view of FIG. 5, in the solid electrolytic capacitor 101 according to the comparative example, the contact part 155 where the erected part 153 contacts the anode lead-out wire 111 is a point, and thus the electrical connection is made at this point. This causes a problem that the connection resistance between the anode lead-out wire 111 and the erected part 153 is increased.

On the other hand, in the solid electrolytic capacitor 1 according to this embodiment, as shown in the right view of FIG. 5, the anode lead-out wire 11 includes the first linear part 22 and the second linear part 23. Therefore, the contact parts 55 and 56 where the erected part 53 contacts the anode lead-out wire 11 are linear, and thus the connection is a surface contact. It is therefore possible to decrease the connection resistance between the anode lead-out wire 11 and the erected part 53.

Further, as shown in a solid electrolytic capacitor 102 according to a comparative example in the left view of FIG. 6, when an anode lead-out wire 111 is formed to have a flat shape and an anode lead-out wire 111 and an erected part 153 contact each other at two contact parts 157 and 158, a spark may be generated at the time of welding (a spark may be generated in the configuration shown in FIG. 5 as well).

On the other hand, in the solid electrolytic capacitor 1 according to this embodiment, the anode lead-out wire 11 is welded to the erected part 53 in a state in which the first linear part 22 and the second linear part 23 of the anode lead-out wire 11 contact the erected part 53 (anode lead frame). That is, the anode lead-out wire 11 is welded in the state in which the erected part 53 and the anode lead-out wire 11 are in surface contact each other, whereby it is possible to prevent a spark from being generated at the time of welding.

When, for example, the value of A/B of the anode lead-out wire 11 according to this embodiment was set to be 0.1 or larger and 0.9 or smaller and the value of D/C thereof was set to be 0.1 or larger and 0.9 or smaller (see FIG. 4), the spark generation percentage when the anode lead-out wire 11 was welded to the erected part 53 was 0% (0% in 20 samples). On the other hand, when the anode lead-out wire 111 shown in the left view of FIG. 6 was used, the spark generation percentage when the anode lead-out wire 111 was welded to the erected part 153 was 50% (50% in 20 samples).

Further, in a case in which the anode lead-out wire 111 is made to have a cylindrical structure (i.e., the cross-sectional shape thereof is circular), like in the solid electrolytic capacitor 101 according to the comparative example shown in FIG. 5, when the diameter of the anode lead-out wire 111 is decreased in order to make the solid electrolytic capacitor thin, there is a case in which the anode lead-out wire 111 is bent when the anode lead-out wire 111 is inserted into the anode body powder. Further, in a case in which the cross-sectional shape of the anode lead-out wire is a simple flat shape, the anode lead-out wire tends to be bent. In this case, there is a case in which the anode lead-out wire 111 is bent when the anode lead-out wire is inserted into the anode body powder.

On the other hand, in the solid electrolytic capacitor 1 according to this embodiment, the recess 21 is provided in at least one of the upper surface and the lower surface of the anode lead-out wire 11, whereby the strength against bending of the anode lead-out wire 11 can be increased. It is therefore possible to prevent the anode lead-out wire 11 from being bent when the anode lead-out wire 11 is inserted into the anode body powder.

When, for example, the value of A/B of the anode lead-out wire 11 according to this embodiment was set to be 0.1 or larger and 0.9 or smaller and the value of D/C thereof was set to be 0.1 or larger and 0.9 or smaller (see FIG. 4), the percentage that bending has occurred when the anode lead-out wire 11 was inserted into the anode body powder was 0% (0% in 100 samples). On the other hand, when the same demonstration has been conducted using a flat anode lead-out wire without the recess 21, the percentage that bending has occurred when the anode lead-out wire is inserted into the anode body powder was 20% (20% in 100 samples).

Further, in the solid electrolytic capacitor 1 according to this embodiment, the recess 21 is provided in at least one of the upper surface and the lower surface of the anode lead-out wire 11. Therefore, when the anode lead-out wire 11 is inserted into the anode body powder, a part of the anode body powder can be made to flow along the shape of the recess 21. In this manner, by causing the anode body powder to flow in the vicinity of the surface of the anode lead-out wire 11, it is possible to prevent the density of the anode body powder from being high. Therefore, an oxidant solution, a monomer liquid, and a conductive polymer solution are easily soaked into the anode body. Accordingly, the solid electrolyte 14 formed by polymerization reaction can be formed uniformly, whereby it is possible to prevent the ESR value from being increased.

For example, the equivalent series resistance (ESR) of the solid electrolytic capacitor according to this embodiment at an operation frequency of 100 kHz was 20 mΩ or smaller. Meanwhile, in the solid electrolytic capacitor using the anode lead-out wire having a flat shape where the recess 21 is not provided, the ESR at an operation frequency of 100 kHz was 30 mΩ, which is 1.5 times larger than that in this embodiment.

Next, a method for manufacturing the solid electrolytic capacitor according to this embodiment will be described.

When the solid electrolytic capacitor according to this embodiment is manufactured, first, an anode lead-out wire 11 having a flat cross section (the shape as shown in FIG. 4) is formed. Then, a capacitor element 10 in which the anode lead-out wire 11 is embedded is formed. Specifically, after the anode lead-out wire 11 is inserted into an anode body powder (tantalum powder), it is sintered, whereby an anode body 12 (see FIG. 2) is formed. After that, a dielectric layer 13 is electrochemically formed on a surface of the anode body 12. The dielectric layer 13 may be formed, for example, by anodizing the surface of the anode body 12.

After that, a solid electrolyte layer 14 is formed on a surface of the dielectric layer 13. For example, the solid electrolyte layer 14 may be formed using a conductive polymer. In order to form the solid electrolyte layer 14, for example, chemical oxidative polymerization, electrolytic polymerization or the like may be used. Alternatively, the solid electrolyte layer 14 may be formed by coating or impregnating a workpiece with a conductive polymer solution and drying it. Next, a cathode body 15 is formed on a surface of the solid electrolyte layer 14. Then, the cathode body 15 is connected to a cathode terminal 52 using a conductive adhesive.

Figure 7:
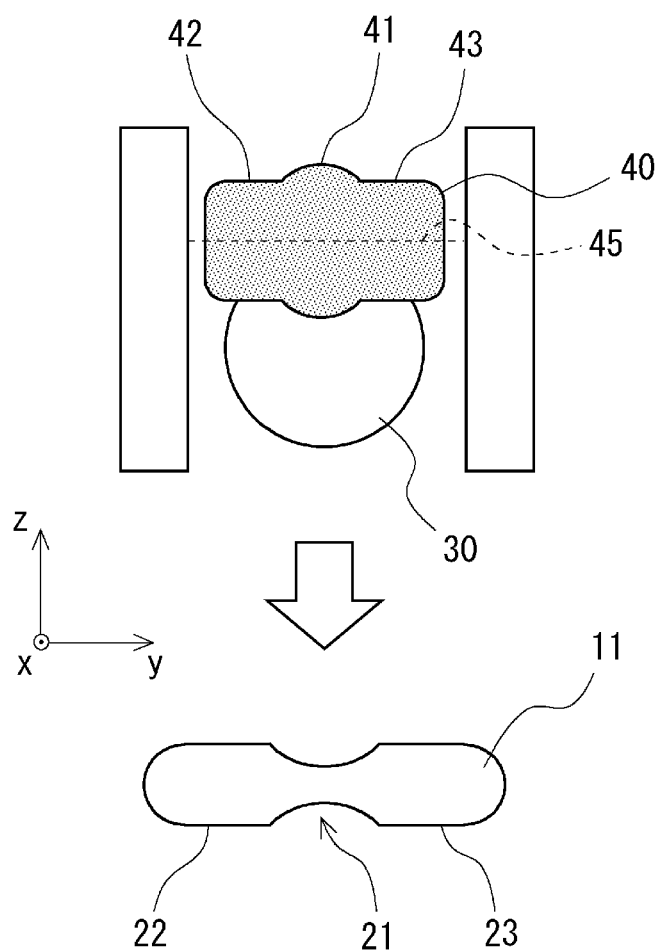
FIG. 7 is a cross-sectional view for describing a method for manufacturing the anode lead-out wire according to the embodiment.

Next, a method for manufacturing the anode lead-out wire according to this embodiment will be described. FIG. 7 is a cross-sectional view for describing the method for manufacturing the anode lead-out wire according to this embodiment. The anode lead-out wire 11 according to this embodiment is manufactured by sending a wire 30, which is a raw material of the anode lead-out wire 11, in the x-axis direction while flattening the upper and lower surfaces of the wire 30, by two rollers 40. In FIG. 7, a lower roller is not shown.

In this embodiment, a protrusion 41, a third linear part 42 that is extended outward from one side of the protrusion 41, and a fourth linear part 43 that is extended outward from the other side of the protrusion 41 are provided on a surface of the roller 40. The roller 40 is rotated about a rotation axis 45. By flattening the upper and lower surfaces of the wire 30 by the two rollers 40 having the aforementioned shape, the anode lead-out wire 11 as shown in FIG. 4 may be formed.

That is, the protrusion 41 of the roller 40 forms the recess 21 of the anode lead-out wire 11, the third linear part 42 of the roller 40 forms the first linear part 22 of the anode lead-out wire 11, and the fourth linear part 43 of the roller 40 forms the second linear part 23 of the anode lead-out wire 11.

In this embodiment, the third linear part 42 and the fourth linear part 43 are provided on the both respective sides of the protrusion 41 of the surface of the roller 40. It is therefore possible to prevent the position of the wire 30 from being deviated with respect to the roller 40 when the anode lead-out wire 11 is manufactured by flattening the upper and lower surfaces of the wire 30 by the two rollers 40.

In the configuration example in FIG. 7, a configuration example in which the cross-sectional shape of the protrusion 41 is a curved shape is shown. However, in this embodiment, the cross-sectional shape of the protrusion 41 may be a shape other than the curved shape and is not particularly limited as long as it has a shape that it is gradually elevated toward the central part of the protrusion 41.

Figure 8:
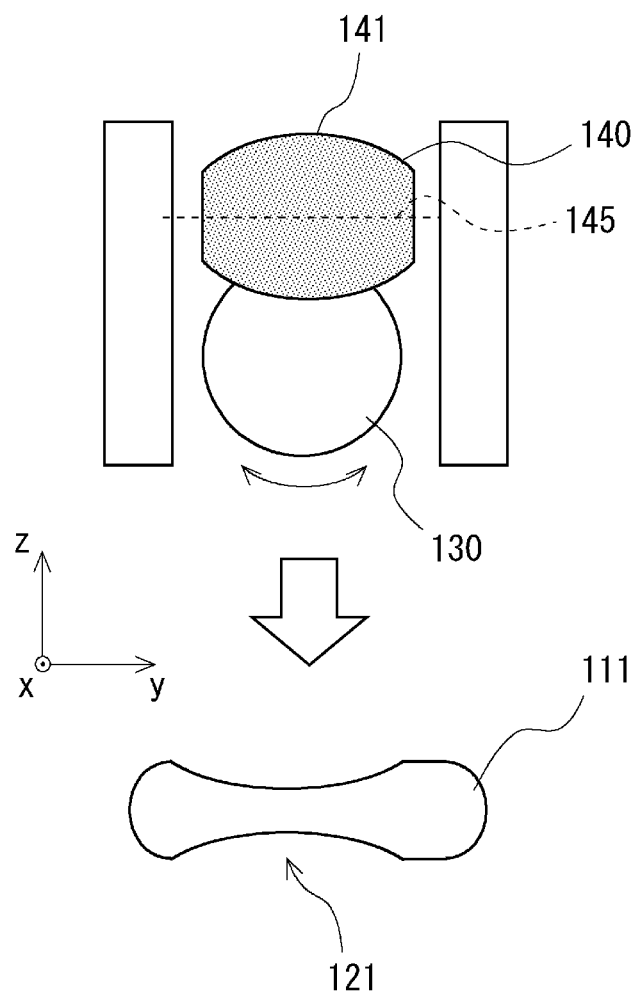
FIG. 8 is a cross-sectional view for describing a method for manufacturing the anode lead-out wire according to related art.

FIG. 8 is a cross-sectional view for describing a method for manufacturing the anode lead-out wire according to related art. In the related art, only a protrusion 141 having a curved shape is provided on a surface of a roller 140. The roller 140 is rotated about a rotation axis 145. In FIG. 8 as well, a lower roller is not shown.

In the related art shown in FIG. 8, when an anode lead-out wire 111 is formed by flattening upper and lower surfaces of a wire 130 by the two rollers 140, the wire 130 may be deviated to the right or left (the y-axis direction) (see the arrow in FIG. 8). Therefore, as shown in the lower view of FIG. 8, there is a case in which the position of a recess 121 formed in the formed anode lead-out wire 111 is deviated from the central part.

On the other hand, in this embodiment, as shown in FIG. 7, the third linear part 42 and the fourth linear part 43 are provided on the both respective sides of the protrusion 41 of the surface of the roller 40. Therefore, when the anode lead-out wire 11 is manufactured by flattening the upper and lower surfaces of the wire 30 by the two rollers 40, the position of the wire 30 may be prevented from being deviated with respect to the roller 40. It is therefore possible to prevent the position of the recess 21 formed in the anode lead-out wire 11 from being deviated from the central part.

In this embodiment, the protrusion 41, the third linear part 42, and the fourth linear part 43 may be provided in at least one of the upper and lower rollers 40. That is, when the recess 21, the first linear part 22, and the second linear part 23 are formed in only one of the anode lead-out wire 11, the protrusion 41, the third linear part 42, and the fourth linear part 43 are provided in only one of the two rollers 40.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A solid electrolytic capacitor comprising:
an anode lead-out wire; and
a capacitor element in which the anode lead-out wire is embedded, wherein
a cross section of at least a part of the anode lead-out wire in a direction in which the anode lead-out wire is extended has a flat shape,
a recess provided in a central part, a first linear part that is extended outward from one side of the recess, and a second linear part that is extended outward from another side of the recess are formed in at least one of an upper surface and a lower surface of the anode lead-out wire having the flat shape,
each of the recesses has a cross-sectional shape that is gradually deepened toward the central part of each of the recesses,
when the distance between one side of the recess and the other side of the recess is denoted by A and the distance from an outer edge part of the first linear part to an outer edge part of the second linear part is denoted by B, the value of A/B is 0.1 or larger and 0.9 or smaller, and each of side parts of the anode lead-out wire held between the upper surface and the lower surface of the anode lead-out wire have a curved shape that bulges outward.

2. The solid electrolytic capacitor according to claim 1, wherein the value of A/B is 0.2 or larger and 0.5 or smaller.

3. The solid electrolytic capacitor according to claim 1, wherein
the recess, the first linear part, and the second linear part are formed in each of the upper surface and the lower surface of the anode lead-out wire, and
when the thickness of the anode lead-out wire is denoted by C and the distance between the bottom of the recess on the upper surface and the bottom of the recess on the lower surface is denoted by D, the value of D/C is 0.05 or larger and 0.95 or smaller.

4. The solid electrolytic capacitor according to claim 1, wherein the anode lead-out wire has a flat cross section in a part of the anode lead-out wire that is embedded in the capacitor element.

5. The solid electrolytic capacitor according to claim 1, wherein the anode lead-out wire has a flat cross section in a part of the anode lead-out wire that is exposed from the capacitor element.

6. The solid electrolytic capacitor according to claim 5, wherein the anode lead-out wire is welded to an anode lead frame in a state in which the first linear part and the second linear part contact the anode lead frame.

7. The solid electrolytic capacitor according to claim 1, wherein
the anode lead-out wire penetrates the capacitor element,
the anode lead-out wire forms a first anode lead-out wire in one side of the anode lead-out wire exposed from the capacitor element and forms a second anode lead-out wire in another side thereof,
the first anode lead-out wire is welded to a first anode lead frame erected from a substrate, and
the second anode lead-out wire is welded to a second anode lead frame erected from the substrate.

8. The solid electrolytic capacitor according to claim 1, wherein the capacitor element is encased in an exterior resin and the height of the solid electrolytic capacitor including the exterior resin is 3.0 mm or smaller.

9. The solid electrolytic capacitor according to claim 1, wherein an equivalent series resistance of the solid electrolytic capacitor at an operation frequency of 100 kHz is 20 mΩ or smaller.

* * * * *